United States Patent

Burl et al.

[11] Patent Number: 6,151,363
[45] Date of Patent: Nov. 21, 2000

[54] VIDEO IMAGE PROCESSING

[75] Inventors: Michael Burl, Twickenham; Phillip Graham Layton, Sutton, both of United Kingdom

[73] Assignee: British Broadcasting Corporation, London, United Kingdom

[21] Appl. No.: 08/893,132

[22] Filed: Jul. 15, 1997

Related U.S. Application Data

[63] Continuation of application No. 08/199,174, filed as application No. PCT/GB92/01607, Sep. 3, 1992.

[30] Foreign Application Priority Data

Sep. 3, 1991 [GB] United Kingdom .................... 9118782

[51] Int. Cl.[7] ...................................................... H04N 7/12
[52] U.S. Cl. ................................ 375/240.17; 375/240.16; 348/416.1; 348/699
[58] Field of Search ................................ 348/699–700, 348/701, 409, 416, 441, 452, 459, 579, 448, 402.1, 407.1, 413.1, 416.1, 431.1; 375/240.16, 240.17; 382/236, 239; 386/109, 111

[56] References Cited

U.S. PATENT DOCUMENTS

| | | | |
|---|---|---|---|
| 4,296,434 | 10/1981 | Drewery et al. | 348/579 |
| 4,639,773 | 1/1987 | Hurst | 348/700 |
| 4,731,648 | 3/1988 | Bernard et al. | 348/700 |
| 4,733,297 | 3/1988 | Katsumata et al. | 348/701 |
| 4,890,160 | 12/1989 | Thomas | 348/699 |
| 4,924,305 | 5/1990 | Nakagawa et al. | 348/415 |
| 4,987,489 | 1/1991 | Hurley et al. | 348/459 |
| 5,001,563 | 3/1991 | Doyle et al. | 348/441 |
| 5,019,903 | 5/1991 | Dougall et al. | 348/448 |
| 5,025,495 | 6/1991 | Avis | 348/452 |
| 5,051,826 | 9/1991 | Ishii et al. | 348/409 |
| 5,280,350 | 1/1994 | DeHaan et al. | 348/699 |
| 5,444,494 | 8/1995 | Yamamoto et al. | 348/448 |

FOREIGN PATENT DOCUMENTS

| | | | |
|---|---|---|---|
| 0 179 594 A1 | 4/1986 | European Pat. Off. | H04N 7/01 |
| 2 188510 | 9/1987 | United Kingdom | H04N 7/24 |
| 2 231 743 | 11/1990 | United Kingdom | H04N 7/01 |
| WO 85/02080 | 5/1985 | WIPO | H04N 5/14 |

*Primary Examiner*—Vu Le
*Attorney, Agent, or Firm*—George W. Neuner; Dike, Bronstein, Roberts and Cushman, LLP

[57] ABSTRACT

A method of generating motion vectors from a video signal, for use in motion compensation, is applicable to interlaced video signals. In the method alternate video fields are shifted vertically so as to align the picture lines of interlaced fields, by moving the lines of one field up by half a picture line and the lines of the next field down by half a picture line. The fields of each resultant pair are compared to produce a set of motion vectors which can be used to motion compensate the video signal. The accuracy may be improved using temporal filters operative on correlation surfaces derived over tow or more field intervals.

29 Claims, 5 Drawing Sheets

VIDEO IMAGE PROCESSING

This application is a continuation of copending application Ser. No. 08/199,174 filed on Apr. 28, 1994 which is a 371 of PCT/GB92/01607 filed Sep. 3, 1992.

This invention relates to video image processing, and more particularly to the generation of motion vectors indicating the direction and magnitudes of apparent movement to different regions of an image. Such vectors can then be used to assist in the generation of desired output images.

In our United Kingdom Patent GB-B-2188510 a method of processing a video image is described which produces a list of motion vectors which are applicable over a measurement block in a video image. An appropriate one of these motion vectors may be assigned to each region of the image. Each region may be as small as a picture element (pixel) or it may comprise a plurality of picture elements or an arrangement block of the picture.

Such motion vectors are particularly useful when it is desired to generate output video fields which correspond to instants in time intermediate two input fields. Such output fields are necessary in video image processing systems which transfer video images to or from film, in standards conversion, or in producing slow motion effects. In our International Patent Application No. PCT/GB92/00952 methods for generating the motion vectors for assignment to either a particular input field or over a particular interfield interval are described.

In a conventional PAL television signal successive fields are interlaced. That is to say each field contains data to be displayed on alternate lines of a video display. This is known as 2:1 interlace. We have found that when vectors are derived between a pair of successive interlaced video fields errors can occur in the vectors derived therefrom as a result of the fact that data is on alternate interlaced picture lines.

For this reason it is preferable to perform the derivation of vectors by methods such as phase correlation between successive frames of the video image, e.g. by correlating between alternate fields of a 2:1 interlaced signal such that there is no vertical difference between the lines of data which are being correlated. If such an approach is adopted, however, the maximum motion speed which can be measured is half that which could be measured using interfield correlation.

Preferred embodiments of the present invention, therefore, seek to provide a solution to these problems such that interfield correlation can be performed without any significant errors occuring in the motion vectors determined thereby.

The present invention is defined in the appended claims to which reference should now be made.

Preferred embodiments of the invention will now be described in detail by way of example with reference to the accompanying figures in which:

FIG. 1a) and b) show a pair of interlaced video fields and the result of a vertical shift imposed on them in an embodiment of the invention;

FIG. 1a) shows a pair of successive interlaced video fields at their respective intervals in time. The lines of the first video field are represented by x's and the lines of the second video field by x's in circles. The vertical displacement of the interlaced video fields by one line can be seen clearly.

In FIG. 1b) the same pair of video fields can be seen after shifting by an embodiment of the present invention. Each of the fields of FIG. 1a has been shifted by a half picture line, the first field having been shifted downwards and the second field have been shifted upwards by this amount. As a result the picture lines of both fields are vertically aligned in FIG. 1b). Arrows in FIG. 1a) indicate the direction and magnitude of the shift.

The two vertically aligned fields can then be correlated according to the method described in our United Kingdom Patent GB-B-2188510 to derive a set of motion vectors for assignment to areas of the picture. Other methods of deriving vectors such as block matching could also be used.

The process by which the two fields are aligned has been described above as shifting the input fields. The process by which this is achieved is in practice more complex than simply moving data from positions shown in FIG. 1a) to those shown in FIG. 1b). The processing circuitry does not in fact have an indication of the vertical position data will occupy on a display. What in fact occurs is that data in the line positions of FIG. 1b) is interpolated from data in the line positions of FIG. 1a). The resultant line positions of FIG. 1b) have data assigned to them which would in fact have been present if the signal had been produced by scanning those line positions.

The schemes by which new lines of a video signal may be interpolated will be familiar to those skilled in the art and may be implemented using conventional hardware or software.

What is required for the purposes of the embodiments of the invention described herein is a spatial interpolation taking data from other lines in the same field as the new lines to be generated, multiplying the data from each other line by a constant and adding the resultant sums together. The constants are selected to sum substantially to unity so that the data for a new line position will be of the same order of magnitude as that in the old lines of the video signal.

Figure 5:
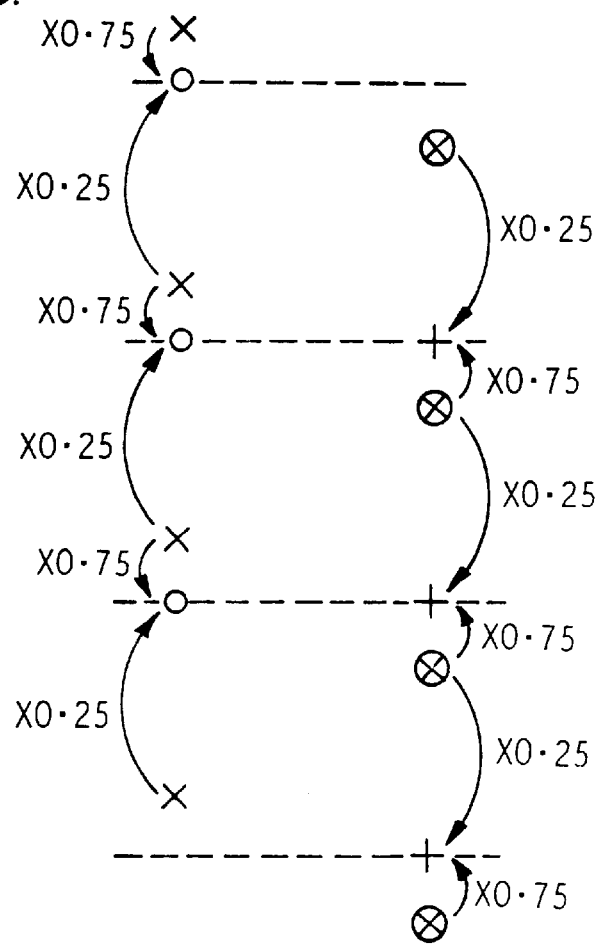
FIG. 5 shows a two-tap interpolation scheme for use in an embodiment of the invention.

For example, FIG. 5 shows a simple two-tap interpolation producing the line positions of FIG. 1b) from those of FIG. 1a). The lines which contribute to the new lines have arrows originating from them which end at the new lines to which they contribute. Each arrow has a multiplication constant corresponding to the constant by which the line from which it originates is multiplied. In this example each new line is comprised of data from two adjacent lines multiplied by constants of 0.25 and 0.75. The nearer of the original lines has the constant of 0.75 assigned to it.

Figure 6:
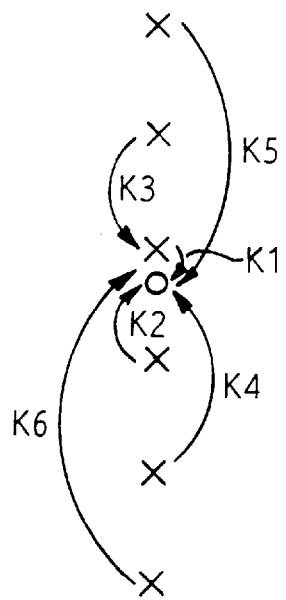
FIG. 6 shows a six-tap interpolation scheme for use in an embodiment of the invention.

It is preferable to use a more sophisticated interpolator to derive data for the new line positions. It has been found that a six-tap interpolator gives good results. An example of such an interpolator is shown schematically in FIG. 6 for a single field. Again the new lines to be derived are at one quarter field line positions. The generation of one new line is shown. This new line comprises data from each of the six nearest lines in the field and multiplied by constants K1–K6 respectively. The values of the constants vary with distance from the new line position and are chosen to give different weights to different lines. Various different weighting schemes may be used. We have found that if there are no aliasing components in the input video signal, a high order interpolator (e.g. six-tap) will give the correct value at the inbetween points where new lines are to be generated.

The effect of this vertical re-alignment and subsequent correlation of the fields is to double the range of maximum velocity which can be detected in the sequence of video images. There is also a reduction in the amount of noise on the phase correlation surface derived. This reduction in the noise is a result of there being less uncorrelated material in the correlation surface as a result of the higher sampling rate achieved. It will be appreciated that vectors derived between successive fields are better able to follow complex motion in the video sequence and rapid accelerations than would be possible with correlations produced at the frame sampling rate.

We have discovered that some small vertical motions are detected by the system which were not present in the original input video signal. These are probably due to alias components in the original source material. This effect can be removed with an additional temporal filter as described below.

In order to improve further the correlation noise a temporal filter may be used with the invention and two possible types are described in our International Patent Application No. PCT/GB92/00952. The advantages of using such a temporal filter are to improve the signal to noise ratio of the correlation surface, to retime the correlation surface prior to assignment, and to reduce the alternate vertical errors which arise from the fact that successive correlation surfaces are derived from alternate interline positions in the video signal.

Figure 2:
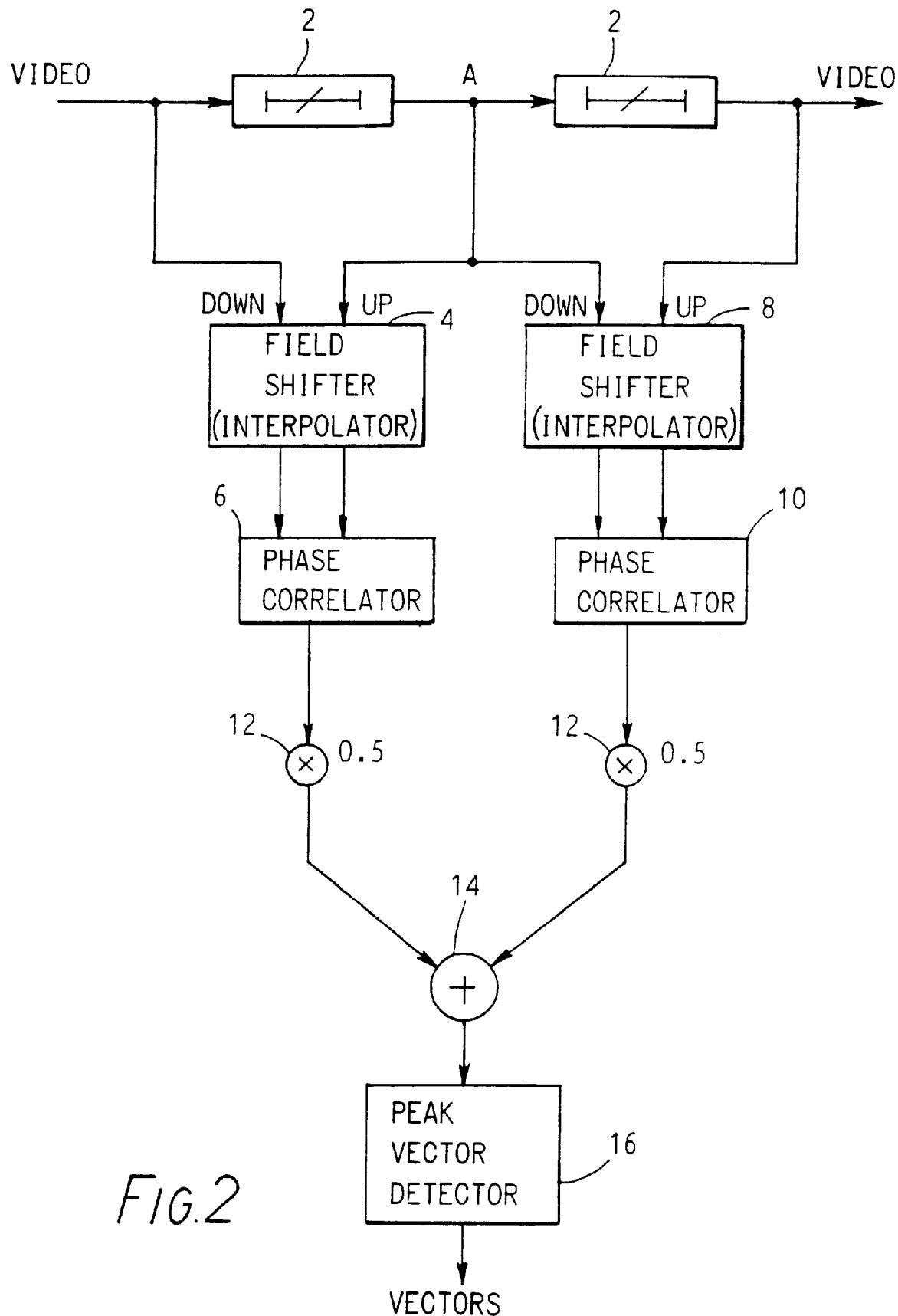
FIG. 2 shows a first system embodying the invention.

FIG. 2 shows a first embodiment of a circuit including a temporal filter. This circuit operates according to what is referred to as the three field method of our International Patent Application No. PCT/GB92/00952. It produces an output list of vectors suitable for assignment to the central field of three successive input fields, the field present at point A in the figure.

Figure 1:
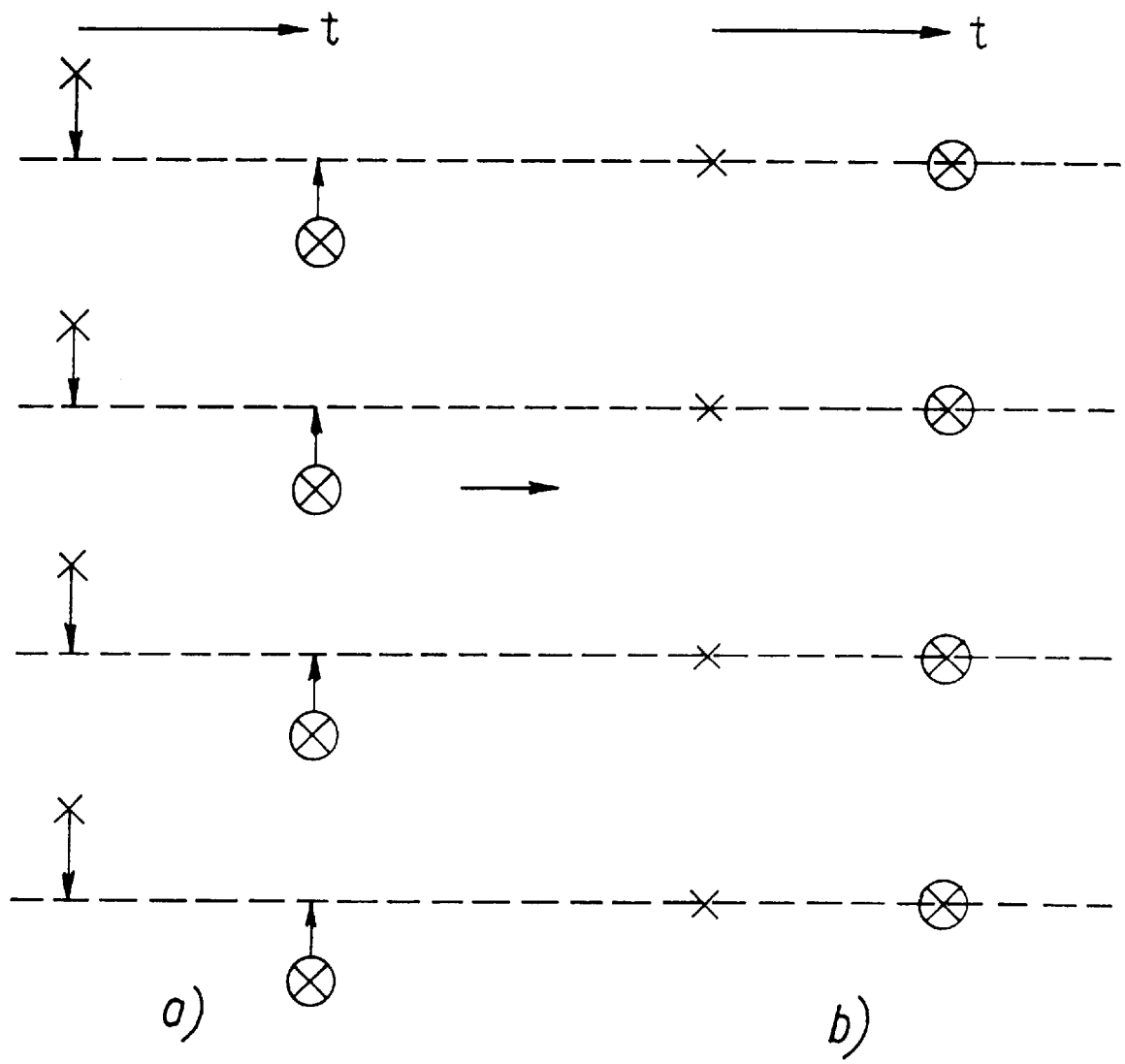

Input video fields pass through successive field delays 2, thus making three successive video fields available for phase correlation. In operation this results in a first pair of video fields being applied to the respective down and up inputs of a field shifter 4 (interpolator). This shifts the field data as shown in FIG. 1 and produces output fields which form the input to a phase correlator 6. At the same time the field of the pair which is present at point A also passes to the down input a second field shifter 8 (interpolator) which has its up input receiving a field which has been delayed by a further field period than the field at point A. This second field shifter shifts the field data in a direction opposite to that of FIG. 1. This produces half line shifted fields which are input to a further input phase correlator 10. Thus the line positions in the fields input to correlator 6 are interlaced with those input to correlator 10. Thus correlation surfaces are derived between first and second, and second and third fields in the video sequence.

It will be appreciated that the fields output by field shifter 4 are at vertical positions which are interlaced with the fields output by field shifter 8. Thus a field input to the system of FIG. 2 is subjected to first a down and then an up shift by field shifter 4 and a down and then an up shift by field shifter 8. It is this alternate shifting (interpolating) of fields down and up which reduces the alternate vertical errors in an output picture.

The phase correlation surfaces produced by the phase correlators 6 and 10 are each multiplied by 0.5 in multipliers 12 and the outputs of these are then combined in an adder 14 the output of which is sent to a peak motion vector detector 16. This produces a list of vectors which can then be assigned to elemental areas of the video image.

Figure 3:
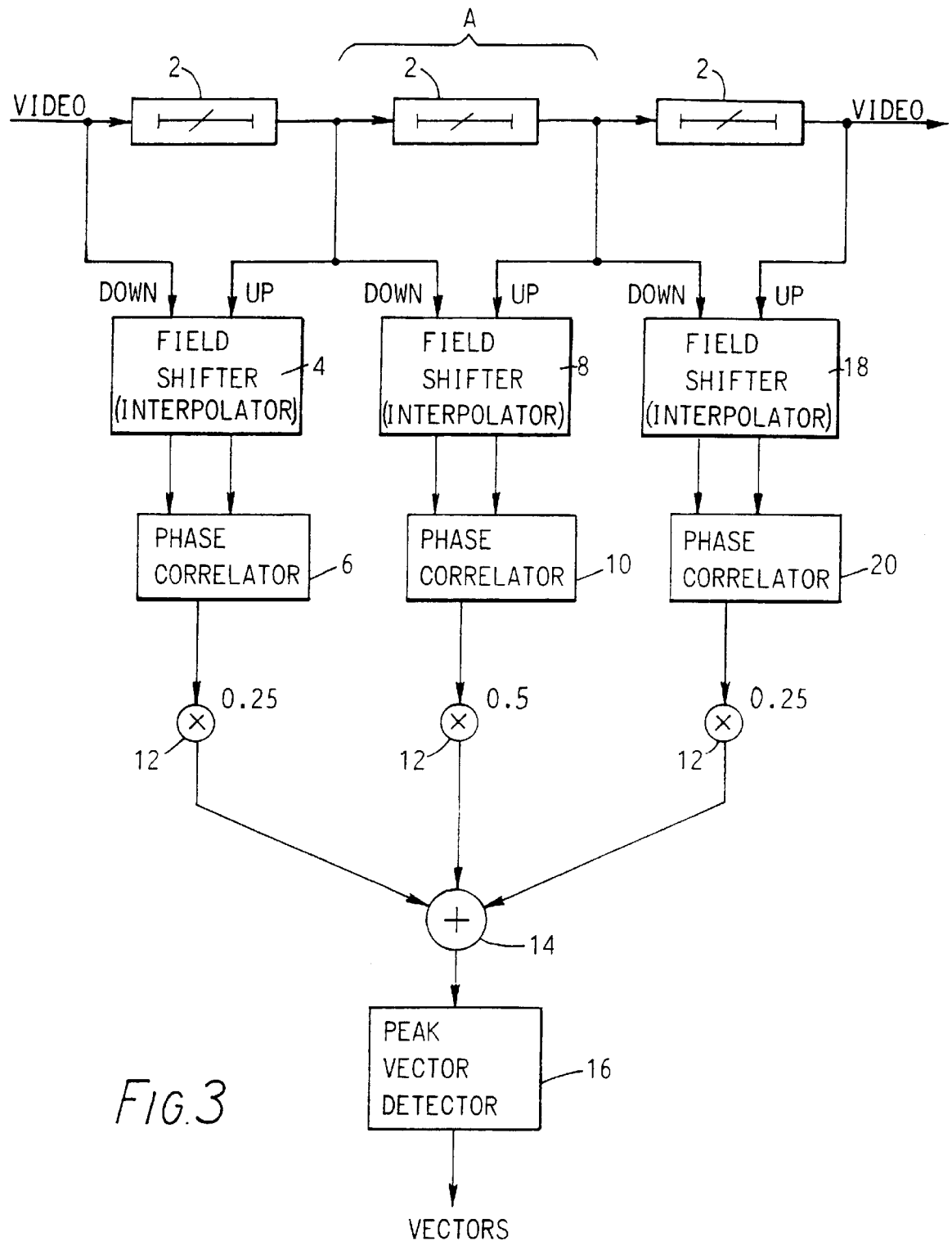
FIG. 3 shows a second system embodying the invention.

FIG. 3 shows a second system embodying the invention in which a further stage has been added to the system of FIG. 2. This implements what is known as the two field algorithm of our International Patent Application No. PCT/GB92/00952 and produces a set of vectors which are applicable over the interfield interval A shown in the figure. Operation of the system is as described in relation to FIG. 2 except that a further delay means 2 has been added and this enables field shifting (interpolating) and phase correlation of a further pair of fields to be performed. Therefore an additional field shifter 18 (interpolator), phase correlator 20 and multiplier have also been added. The co-efficients by which the multipliers in the system operate have also been changed. The central multiplier 12 has a co-efficient of 0.5 whilst the other two have co-efficients of 0.25. All the outputs are combined in adder 14 which provides a correlation surface which is input to the peak vector detector 16 which produces a set of vectors ready for assignment to the video signal.

Figure 4:
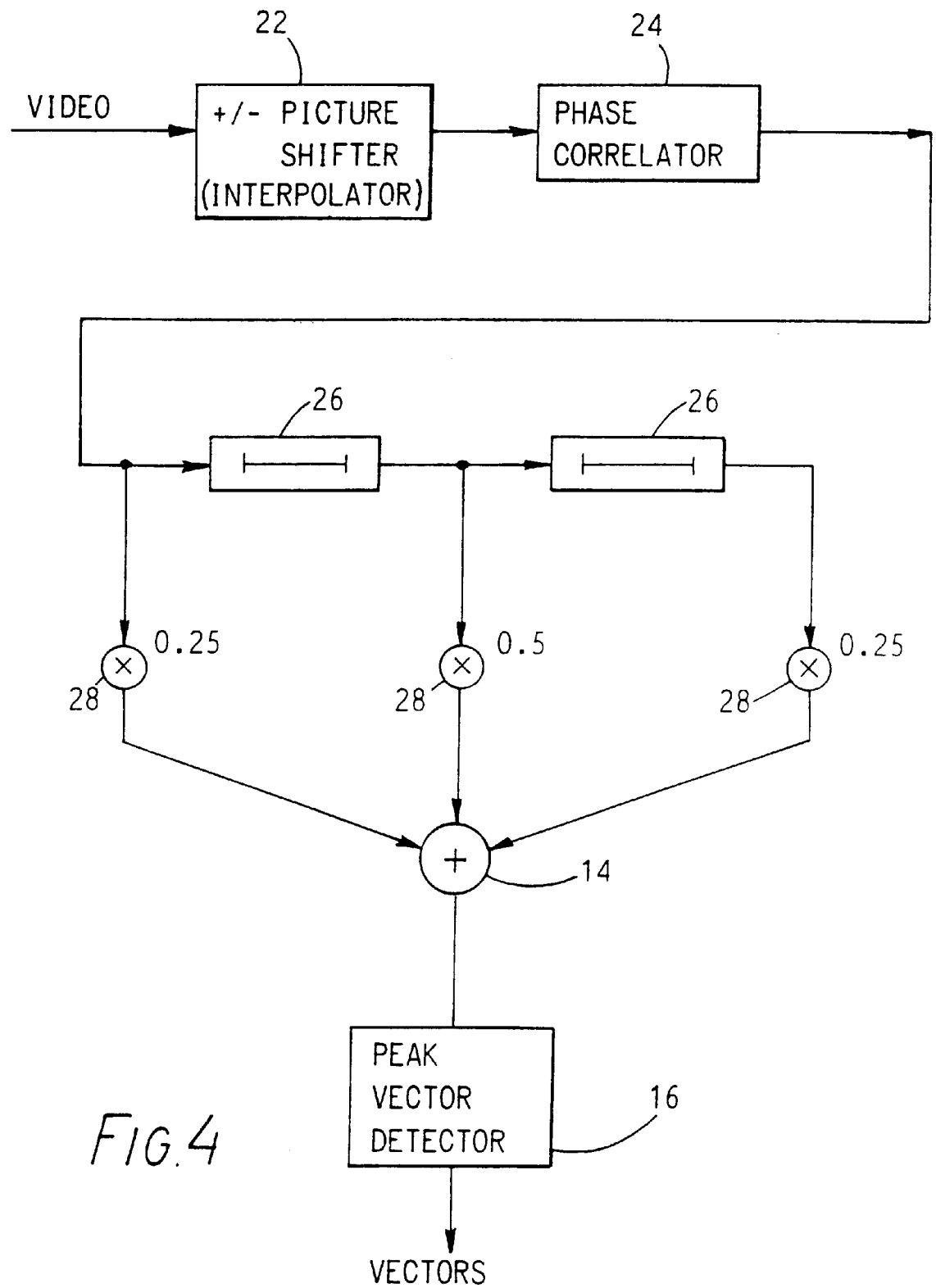
FIG. 4 shows an alternative embodiment of the system of FIG. 3.

An alternative embodiment of the system shown in FIG. 3 is illustrated in FIG. 4. In this a +/− picture shifter circuit 22 (interpolator) shifts alternate input video field data up or down by half a picture line. The shifted fields then pass to a phase correlator 24 which produces a phase correlation surface between the pairs of video fields. Two delayed versions of the phase correlation surface output by correlator 24 are produced by field delays 26. The outputs of the two field delays and the phase correlator are multiplied by co-efficients in the three multipliers 28. This central multiplier has a co-efficient of 0.5 whilst the other two have co-efficients of 0.25. The outputs of these multipliers are combined in an adder 14 before passing to a peak vector detector 16 which produces a list of vectors for assignment to the picture.

This circuit can be modified to mimic the circuitry of FIG. 2 simply by setting the co-efficient on the right hand multiplier to 0 and those on the other two multipliers to 0.5. This will then produce a set of vectors for use in the three field algorithm.

The intention with both temporal filters is that odd co-efficients should total the same as the even co-efficients. Thus in the system shown in FIG. 3 and 4 the odd co-efficients (the outer pair) sum to 0.5, the same as the even central coefficients. Thus the same weight is given to vectors derived from each shifted field position used for phase correlation.

Systems embodying the present invention have been described in terms of hardware circuitry but it will be readily apparent to a man skilled in the art that they could also be implemented in general purpose hardware programmed with appropriate software.

What is claimed is:

1. A method of deriving a set of motion vectors from a video signal comprising the steps of:

receiving successive interlaced video fields of a video signal, receiving successive interlaced video fields of a video signal, deriving new lines of video data in the video fields, thereby producing pairs of fields whereby, in each pair of fields, the new lines in one field are substantially vertically aligned with the new lines in the other field, deriving a correlation surface by comparing, in each pair of fields, the new lines in one field with the new lines in the other field, and temporally filtering correlation surfaces derived over two or more field intervals to produce said set of motion vectors.

2. A method of deriving a set of motion vectors from a video signal according to claim 1 in which the new lines are interpolated from the received lines of each video field.

3. A method of deriving a set of motion vectors from a video signal according to claim 2 in which the received lines of each video field are discarded after the new lines have been interpolated.

4. A method of deriving a set of motion vectors from a video signal according to claim 1, in which the fields are 2:1 interlaced and the new lines are derived in positions displaced up and down by half a picture line in alternate fields respectively.

5. A method of deriving a set of motion vectors from a video signal according to claim 1 including the step of selecting a plurality of peak values from the correlation surfaces as the set of motion vectors.

6. A method of deriving a set of motion vectors from a video signal according to claim 1 in which a set of motion vectors is derived corresponding to a particular interfield interval.

7. A method of deriving a set of motion vectors from a video signal according to claim 1 comprising the steps of deriving first and second correlation surfaces from first and second, and second and third input fields respectively, and deriving a set of motion vectors from said first and second correlation surfaces.

8. A method of deriving a set of motion vectors from a video signal according to claim 1 in which a set of motion vectors is derived corresponding to a particular interfield interval.

9. A method of deriving a set of motion vectors from a video signal according to claim 8 comprising the step of deriving first, second and third correlation surfaces from first and second, second and third and third and fourth input fields respectively, and deriving a set of motion vectors from said first, second and third correlation surfaces.

10. A method of deriving a set of motion vectors from a video signal according to claim 1 in which the step of deriving new lines of video data in an input video field comprises deriving lines in positions displaced alternately up and down with each field period and producing a set of motion vectors from the thus derived lines and lines in an adjacent field in a corresponding vertical position.

11. A method according to claim 1, wherein the total contribution from correlation surfaces derived from even-to-odd field pairs to the temporally filtered signal is substantially equal to the total contribution from correlation surfaces derived from odd-to-even field pairs.

12. A method according to claim 1, wherein said pairs of fields produced by deriving new lines of video data have substantially the same number of lines as said successive interlaced video fields received.

13. A system for deriving a set of motion vectors from a video signal comprising means for receiving successive interlaced video fields of a video signal, means for deriving new lines of video data in the video fields thereby producing pairs of fields having vertically substantially aligned picture lines, means for deriving a correlation surface from a pair of fields, and means for temporally filtering correlation surfaces derived over two or more field intervals to produce a set of motion vectors.

14. A system for deriving a set of motion vectors from a video signal according to claim 13 in which the fields are 2:1 interlaced and new lines are derived in positions displaced up and down by half a picture line in alternate fields.

15. A system for deriving a set of motion vectors from a video signal according to claim 13 including means for selecting a plurality of peak values from the correlations surface as the set of motion vectors.

16. A system for deriving a set of motion vectors from a video signal according to claim 13 in which the temporal filtering means derives a correlation surface corresponding to a particular input field.

17. A system for deriving a set of motion vectors from a video signal according to claim 13 in which the temporal filtering means comprises means for deriving first and second correlation surfaces from first and second, and second and third input fields respectively, and means for deriving a set of motion vectors from said first and second correlation surfaces.

18. A system for deriving a set of motion vectors from a video signal according to claim 13 in which the temporal filtering means derives a correlation surface corresponding to a particular interfield period.

19. A system for deriving a set of motion vectors from a video signal according to claim 13 in which the temporal filtering means comprises means for deriving first, second, and third correlation surface from first and second, second and third, and third and fourth input fields respectively and means for deriving a set of motion vectors from said first, second and third correlation surfaces.

20. A system for deriving a set of motion vectors from a video signal according to claim 13 in which the deriving means derives new lines of video data in positions displaced alternately vertically up and down with each field period and produces a set of motion vectors from the thus derived lines and lines in an adjacent field in a corresponding vertical position.

21. A system for deriving a set of motion vectors from a video signal according to claim 13 in which the deriving means comprises interpolating means.

22. A system according to claim 13, wherein the total contribution from correlation surfaces derived from even-to-odd field pairs to the temporally filtered signal is substantially equal to the total contribution from correlation surfaces derived from odd-to-even field pairs.

23. A system according to claim 13, wherein said pairs of fields produced by deriving new lines of video data have substantially the same number of lines as said successive interlaced video fields received.

24. A method of generating a set of motion vectors from a video signal, comprising the steps of receiving successive interlaced video fields of a video signal, spatially filtering the lines of each field to produce pairs of fields having vertically substantially aligned picture lines, deriving a correlation surface from each pair of fields and temporally filtering correlation surfaces derived over two or more field intervals to produce a set of motion vectors.

25. Apparatus for generating a set of motion vector from a video signal, comprising means for receiving successive interlaced video fields of a video signal, means for spatially filtering the lines of each field to produce pairs of fields with vertically substantially aligned picture lines, means for deriving a correlation surface from each pair of fields and means for temporally filtering correlation surfaces derived over two or more field intervals to produce a set of motion vectors.

26. A method of deriving a set of motion vectors from a video signal comprising the steps of:
receiving successive interlaced video fields of a video signal,
deriving new lines of video data in the video fields thereby producing pairs of fields whereby, in each pair of fields, the new lines in one field are substantially vertically aligned with the new lines in the other field,
the method further comprising, in each pair of fields, comparing the new lines in one field with the new lines in the other field to produce a set of motion vectors.

27. A method according to claim 26, whereby the number of lines that are compared in each field is substantially equal to the number of lines in the input field.

28. A method of deriving a set of motion vectors from an interlaced video signal, the method comprising:

receiving successive interlaced video fields, deriving new lines of video data to produce pairs of fields having substantially the same number of lines of video data as the input fields but wherein the lines of video data in each pair of fields are substantially vertically aligned, and comparing the substantially aligned video lines to produce a set of motion vectors.

29. A method according to claim 28, wherein the motion vectors are derived from a correlation surface derived over two or more field intervals, the method further comprising temporally filtering the correlation surface to reduce the magnitude of errors in said motion vectors caused by said deriving of new lines of video data.

\* \* \* \* \*